Feb. 19, 1957  G. J. OXNAM  2,781,777
NON-RETURN VALVES
Filed Aug. 7, 1952  3 Sheets-Sheet 1

Inventor
George John Oxnam

Feb. 19, 1957 G. J. OXNAM 2,781,777
NON-RETURN VALVES
Filed Aug. 7, 1952 3 Sheets-Sheet 2

Inventor
George John Oxnam
by Dean Fairbank & Hirsch
his Attorneys

Feb. 19, 1957 G. J. OXNAM 2,781,777
NON-RETURN VALVES
Filed Aug. 7, 1952 3 Sheets-Sheet 3

Inventor
George John Oxnam
by Dean Fairbank & Hirsch
his Attorneys

United States Patent Office 2,781,777
Patented Feb. 19, 1957

2,781,777

NON-RETURN VALVES

George John Oxnam, Norwood Green, Southall, England, assignor to Alan Muntz & Company Limited, Hounslow, England, a company of Great Britain Application August 7, 1952, Serial No. 303,096

Claims priority, application Great Britain August 16, 1951

9 Claims. (Cl. 137—525.5)

The present invention relates to non-return valves of the type comprising a number of resilient laminae each anchored at its root end within a valve body, and, when the valve is in the closed position, engaging a seating member, the root end of each lamina being clamped at a number of regions spaced apart in a direction transverse with respect to the direction of fluid flow through the valve between a supporting member extending transversely of the lamina over the full width thereof and a number of spaced ribs or fingers on the seating member, and the laminae being adapted to assume the closed position by their own resilience in the absence of fluid pressure.

The valves with which the present invention is concerned are suitable for use as suction valves, for example in air compressors and also for other purposes, for instance as delivery valves.

A difficulty met with in valves of the type referred to is the avoidance of excessive leakage of fluid, when the valves are in the closed position, between the laminae and the surfaces of the supporting members. The difficulty is particularly pronounced in cases where the laminae are thin, as is necessary with high-speed valves, and where therefore bending is liable to take place between the regions of clamping. Fluid can then escape in those regions where bending takes place. The difficulty is even more pronounced in the case where the laminae and the valve body upon which the laminae are mounted are of materials having different coefficients of thermal expansion. Thus it is sometimes necessary to make the body of, for example, die-cast aluminum for the sake of cheapness, whereas the laminae have usually to be made of steel. Where there is such a marked difference in thermal expansion as in this case, bending is very liable to occur owing to differences in expansion.

Another difficulty met with is due to a buckling of the laminae such that there is a transverse curvature and therefore the free edge is not straight. When this happens, there is the condition which may be referred to as the "oil-can bottom effect" in which after a lamina has been moved a certain distance the sense of the curvature reverses suddenly. Such buckling is thought to be due to the laminae bending away from the face of the supporting member in the spaces between the regions of clamping when the body of the valve cools down and contracts more than the laminae. The laminae are then subject to transverse compression.

It is the principal object of the present invention to provide a non-return valve of the type referred to in which a satisfactory root seal is more readily obtainable than with known valves of this type.

A further object of the invention is to avoid the difficulty arising from the "oil-can bottom effect."

According to the present invention, in a valve of the type set forth, each of the laminae is curved, at least in or near the clamping regions, the curvature extending over the lamina in the said transverse direction and serving to stiffen the lamina between the said regions. The supporting members may be parts of stop plates provided to give support to the laminae in their open position and limit the movement of the laminae.

The curvature may take the form of a corrugation and the supporting members may be grooved to accommodate the corrugations. Such an arrangement is particularly suitable for suction valves. For valves, such as delivery valves, the whole lamina may be uniformly curved. The effect of clamping is then substantially to flatten the lamina in the clamping regions and press it against the supporting member between the clamping regions and, in addition, the slight curvature still remaining between the clamping regions or the pre-stressing arising from the clamping of the previously curved lamina serves to stiffen the lamina between these regions and reduce the tendency to buckle. The curvature over the remainder of the laminae provides the necessary initial pressure of the laminae upon their seatings which are, of course, flat.

In valves, such as suction valves, where the curvature of the laminae as a whole is not normally sufficient, a suitable curvature may be provided only in the clamping region.

In the case where curvature to be removed by clamping is employed, no advantage is known in providing a curvature greater than that with which the material will be taken to its yield point when the lamina is clamped. With laminae of a hard rolled 18% Cr, 8% Ni, steel, 0.007 in. thick, the minimum radius of curvature from the point of view just mentioned is about 0.5 in. and a radius of curvature considerably in excess of this and even up to about 6 in. may be found satisfactory.

In order to reduce the adverse effect of dirt that may collect between the laminae and the stop plates there may be provided an arrangement in which the stop plates are provided with recesses extending over a substantial part of the length of the laminae and over which the laminae are out of contact with the stop plates even when in their fully open position. By "length" of a lamina is meant the dimension from the root end to the free end. This construction is preferably employed in valves according to the present invention and the surface of the stop plate beyond the recess is preferably so shaped that as a lamina moves into its fully open position it engages the stop plate along a line, or at least only over a small area, intermediate the root and the free end, and for example about half-way between the clamped region and the free end. When contact with the stop plate is made the free length of the lamina is greatly reduced, with an accompanying reduction or avoidance of impact between adjacent laminae, particularly at the tips of the laminae where such impact is most objectionable.

It may be found desirable in some cases, for example in delivery valves, to shape the stop plates in such a manner that as a lamina moves towards its fully open position it first engages the stop plate along one line and on further movement it engages the stop plate along a second line further from the clamped end than the first line. In one example the first said line of contact is located at a distance from the bend line between ¼ and ⅓ of the length of the lamina from the bend line and the second said line of contact is at a distance from the bend line of about ⅔ of the length of the lamina from the bend line. The distance between the lamina when in the closed position and the shoulder on the stop plate which provides the first line of contact may, for example, be about equal to or rather less than the depth of the recess in the stop plate close to the bend line.

A further difficulty met with the valves of the type referred to arises from a tendency for a dirt or carbon ridge to form on the seating member just beyond the free edge of the lamina when the valve is hot, and when the thermal expansion of the lamina is less than that of the body of the valve, for example with a steel lamina and an aluminium body, this dirt or carbon ridge may impair the seating of the blade tip upon its seating member when the valve is cold. In order to reduce this difficulty it may be arranged that, when cold, the tip of the lamina extends beyond the seating surface. Thus the seating surface may be formed upon a seating member which has a cut-away portion beyond the seating surface, the tip of the lamina extending over this cut-away portion, at least when the valve is cold.

The invention will be described by way of example with reference to the accompanying drawings in which.

Figure 1:
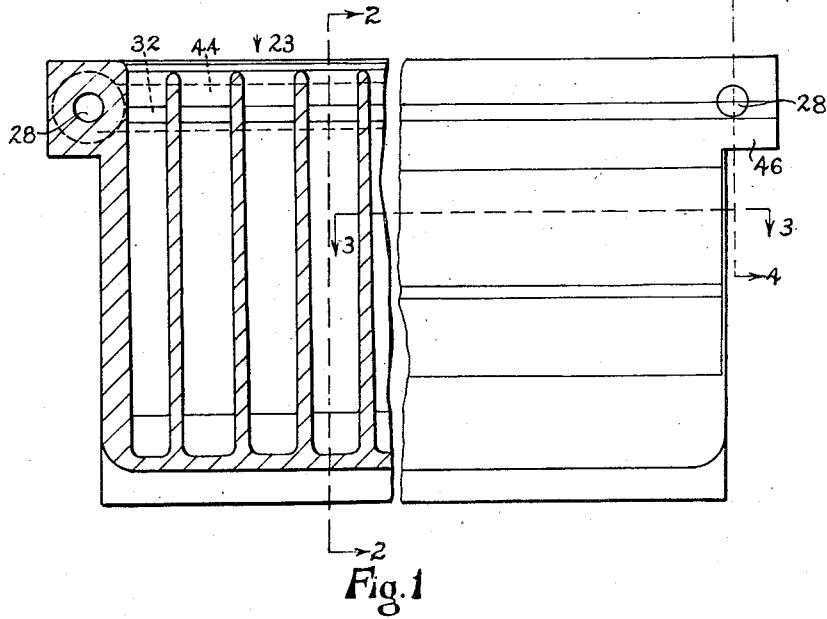
Fig. 1 is a part-sectional side elevation of a non-return valve according to the invention, particularly suitable for use as a suction valve, the section being taken along the line 1—1 in Fig. 2.
Figure 3:
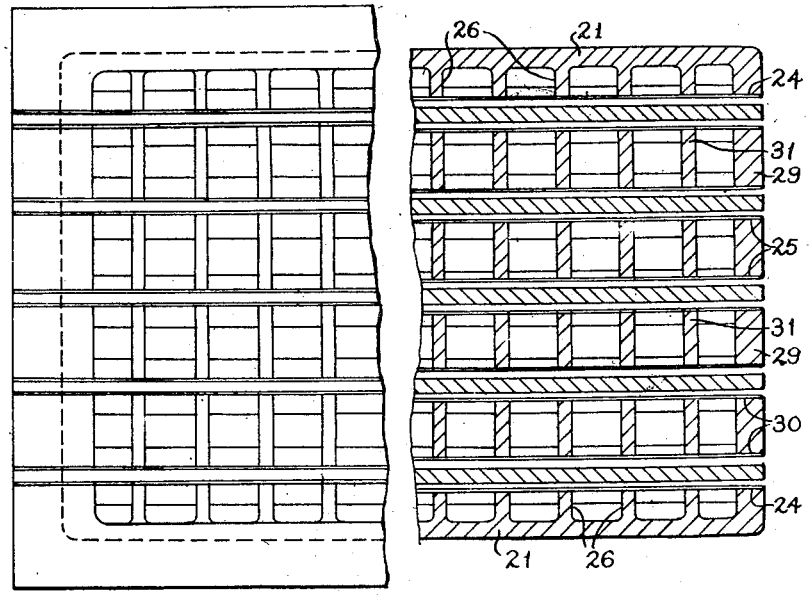
Fig. 3 is a part-sectional plan view of the valve in Figs. 1 and 2, the section being taken along the line 3—3 in Figure 1.
Figure 2:
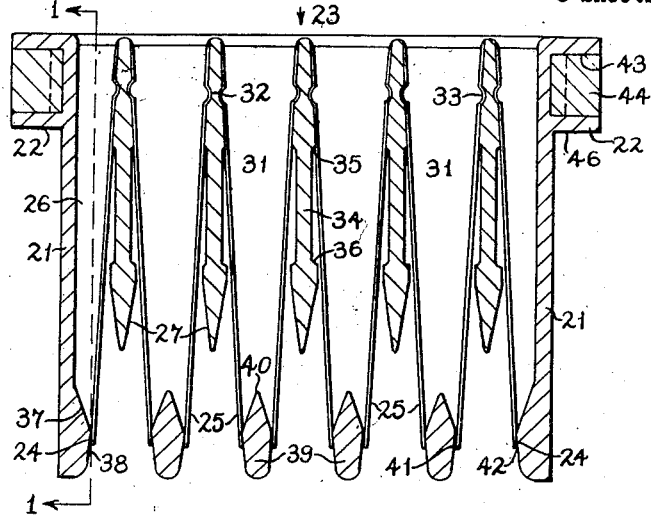
Fig. 2 is a sectional end elevation on the line 2—2 of Fig. 1.
Figures 8, 9:
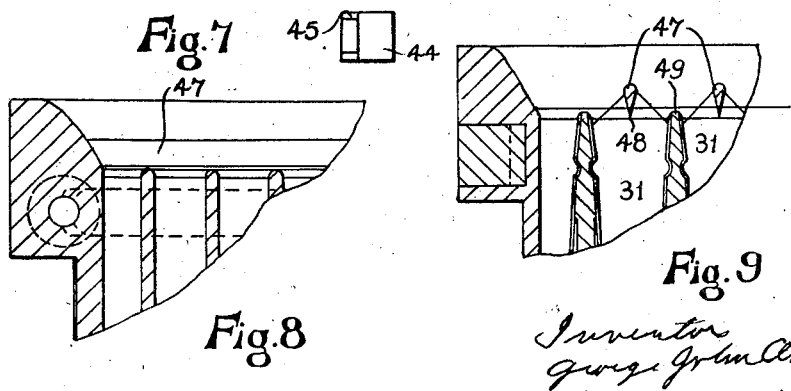

Figs. 8 and 9 contain parts of Figs. 1 and 2 respectively with modifications.

Figure 10:
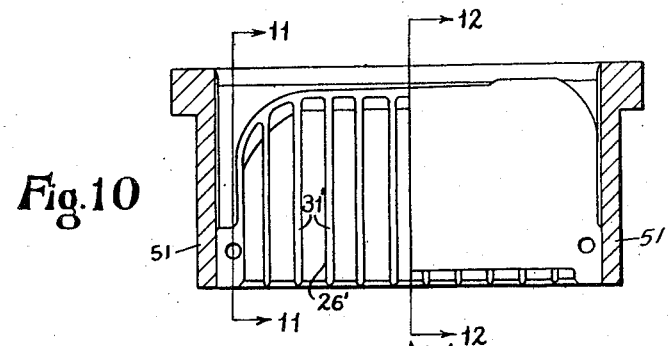

Fig. 10 is a view in part-sectional side elevation of another non-return valve in accordance with the invention, this valve being particularly suitable for use as a delivery valve.

Figure 11:
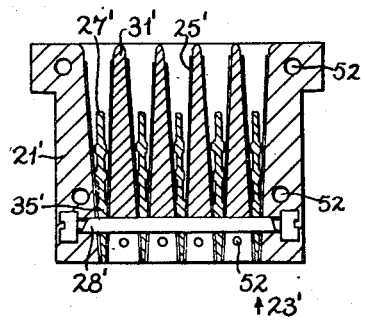
Figure 12:
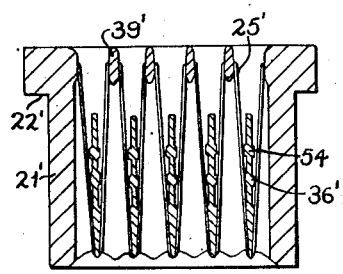

Figs. 11 and 12 are sectional end elevations on the lines 11—11 and 12—12 of Fig. 10.

Figure 13:
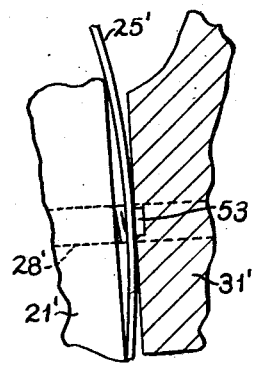

Fig. 13 is an enlarged view of a part of Fig. 11.

Figure 15:
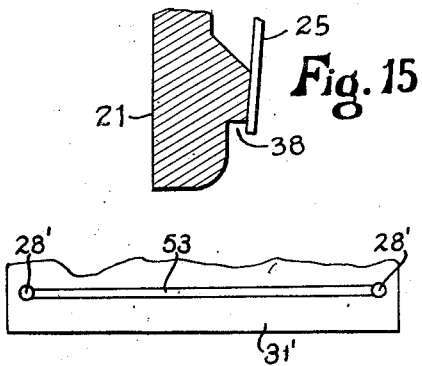
Figure 14:
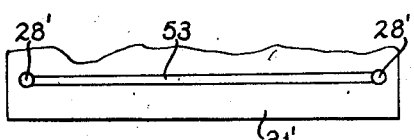

Fig. 14 is a view in side elevation of a part of a stop plate in the valve of Figs. 11 and 12; and Fig. 15 is a fragmentary sectional end elevation on an enlarged scale as compared with the scale of Fig. 2, showing the tip of a lamina extending over the cut-away portion in the seating member beyond the sealing surface on this seating member.

Referring to Figs. 1 to 4, the valve, which may have its body formed of an aluminium alloy, has two identical side valve seat members 21 spaced apart at a suitable distance tied together by screw bolts 28. The side valve seat members are provided with steps 22, the steps constituting parts of a flange which project outwardly from the valve body and serves to fix and locate the body when the valve is fitted into a housing. The remainder of the flange is provided by parts, to be described later, which serve to space the said seat members apart.

The direction of fluid flow is indicated by an arrow 23 in Figs. 1 and 2. For convenience in description the dimension in a direction parallel to that of fluid flow will be referred to as the height dimension, the dimension transverse with respect to the direction of fluid flow and parallel to the laminae 25 will be referred to as the width dimension, and the dimension at right angles to this will be referred to as depth dimension. In this example the outside dimensions of the body portion excluding unless otherwise stated the step, that is to say so far as the depth and width are concerned, the dimensions of the housing into which the valve is intended to fit, are height 1¾ in. including the step or flange, width 3¹¹⁄₃₂ in. and depth 1¹⁵⁄₁₆ in. It will of course be understood that these dimensions are of no significance so far as the invention is concerned, but they will assist in giving some idea of the proportions of certain parts that have been found satisfactory.

Each side valve seat member 21 has on its inner surface two seats 24 to engage the lateral edges of an outer lamina 25 in their closed position and between these seats twelve ribs 36 or fingers to provide longitudinal support for the lamina in its closed position.

The flange or step on the body portion is located at the inlet end of the valve. In the rectangular hollow space within the body portion, between the side valve seat members 21, is a honeycomb structure comprising five stop plates 27 running in the width dimension, and between each pair of adjacent stop plates an intermediate valve seat member 29 having on each side thereof two seats 30 to engage the lateral edges of a lamina and between these two seats twelve ribs or fingers 31. The surfaces of the seats 30 and ribs 31 on each side of the intermediate valve seat members 29, as well as those, 24 and 26, on the side valve seat members 21, are co-planar. The stop plates 27 extend from the inlet face of the valve for about 1¼ in. For about the first ⅜ in. from the inlet end the two opposite surfaces of the stop plate are flat, taper outwardly from the inlet end, and these surfaces have about midway along their length from the inlet end a groove 32 (Fig. 3) extending in the width dimension. Each of these flat surfaces serves as clamping surface for a lamina 25, and the groove serves to accommodate a corrugation 33 in the lamina. Beyond the clamping surface is a recess 34, the edge 35 between the clamping surface and the recess forming the bend line at which bending of the lamina begins. The recess terminates in the downstream direction in a shoulder 36 after which the stop plate tapers relatively sharply to a tip of small radius. The shoulder 36 is arranged to make substantially line contact with the lamina as it moves to its fully open position and acts as a stop. The two outermost laminae 25 are clamped at their roots between the outer clamping surfaces of the outermost stop plates 27 and the up-stream parts of the ribs or fingers 26 on the side valve seat members. The inwardly facing seats and edge surfaces of the ribs or fingers on the intermediate and side valve seat members 21 and 29 are formed at an angle to fit exactly the tapering clamping surfaces on the stop plate 27.

Near to the outlet end of the valve, the inner surfaces of the side valve seat members are tapered inwardly at 37 to the seating surfaces 24 upon which the tips of the two outer laminae seat when in the closed position, these seating surfaces being co-planar with the corresponding clamping surfaces whereby the laminae seat flat upon them. Beyond the seating surfaces is a cut-away portion 38 over which the tips of the laminae are arranged to extend a small distance. In this way if the tips of the laminae become carbonised when the valve is hot, the carbon coating moves away from the seating surface, and over the cut-away portion, when the valve cools, and when, therefore, the body contracts more than the laminae, and such carbonisation does not, therefore, prevent the laminae from seating snugly against their seating surfaces. Any carbon which tends to collect on the seat members does so upon the cut-away portions and does not affect the seating of the laminae on the seating surfaces.

Near the outlet face of the valve the five intermediate valve seat members each have a portion 39 extending across the body in the width dimension and having a height a little less than ⅜ in. These portions have their upstream parts 40 tapering relatively sharply from seating surfaces 41 which are formed in the same manner as those upon the side valve seat members and similarly have cut-away portions 42 extending downstream for the same reason.

The laminae may be of spring steel 0.007 in. thick and the corrugation in each lamina may have a depth from the plane of the lamina of about 0.010 in. The laminae are clamped against the clamping surfaces of the stop plate, with the corrugations engaging in the grooves, by means of the upstream parts of the seats and the ribs or fingers on the side and intermediate valve seat members, the whole structure being clamped together by the tie bolts 28 passed between the two side valve seat members. The intermediate valve seat members 29, the stop plates 27 and the laminae 25 are all provided with outwardly projecting lugs having apertures through which the bolts pass. These lugs together with the steps 22 on the side valve seat members constitute the fixing flange already referred to.

When the valve is opened by suction each lamina bends about the bend line 35 at the edge of the clamping surface and the lamina moves until it engages the shoulder 36 on the stop plate. The stiffness of the blade is then greatly increased, because of the reduction in its free length, and the result is that in the fully open position there is little risk of impact between two adjacent laminae even at a considerable overload suction pressure, or even if such impact should occur its severity is greatly reduced by the increased stiffness of the laminae.

Figure 4:
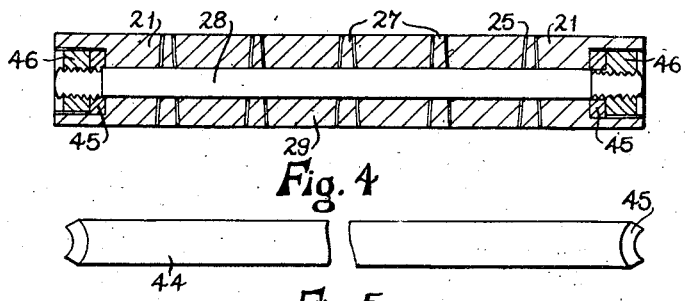
Fig. 4 is a sectional end elevation on the line 4—4 of Fig. 1.
Figure 5:
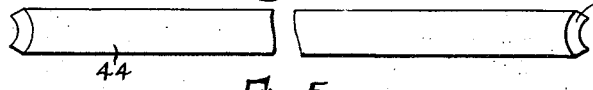
Figs. 5, 6 and 7 are enlarged views of a preset spring used in Figs. 1 to 4 in side elevation, sectional plan and end elevation respectively.
Figure 6:
Figure 7:
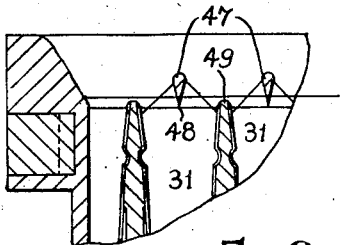

It is often desired to make the valve body as light as possible and it may then be found that the side valve seat members have not sufficient rigidity to ensure proper clamping of the laminae. According to a further subsidiary feature of the invention, therefore, the steps 22 in the side valve seat members are provided with a channel 43 running in the width dimension and in each channel is provided a preset spring 44 which serves to deform the side valve seat member 21, by applying pressure to the central region of the member in such a manner that when clamping by means of the bolt 28 takes place the side valve seat member becomes flat and so acts as an efficient clamp. The spring shown in Figs. 1 and 2 is a leaf spring and this spring is shown in more detail in Figs. 5, 6 and 7. The ends of the spring are suitably curved to abut snugly against the tie bolt 28 and have a portion 45 of reduced thickness which is anchored as shown in Fig. 4 under the nuts 46 of clamping bolts and the centres of the springs engaging the centres of the grooves.

When the valve of this invention is used as a suction valve, the pressure exerted upon the outer walls of the body tending to burst the valve when closed depends upon the position of the bend line 35 in relation to the position of the seating 46 upon the fixing flange. This is because the pressure-tight joint between the laminae and the stop plates is substantially at the bend liens, and the pressure-tight joint between the valve body and its housing is at the seating of the flange. If the bend lines and flange seating surface are in the same plane transverse with respect to the direction of air flow, the pressures on the two sides of the outer walls will be equal and there will be no bursting forces. It is found desirable to locate the bend line approximately in this position and preferably slightly further from the inlet face than (that is on the downstream side of) the plane of the flange seating surface. The resulting small forces upon the outer walls are then inwardly-directed.

When the valve described is taken apart for overhaul there is some risk of the slender, cantilever fingers 31 upon the intermediate seating members becoming bent. In order to reduce this risk there may be provided, as shown in Figs. 8 and 9, in association with each intermediate seating member, a web 47 connecting the extremities of the fingers and disposed in the medial plane of the member. The web may be of streamlined shape in cross-section and its dimensions should be so chosen as to give adequate support with a minimum reduction in entry area and minimum resistance to fluid flow. When used in a valve of the dimensions described, the web may have a height of about ⅛ in. and a depth of about .04 in. The inner edge 48 of the web may be located slightly downstream of the plane containing the upstream edges 49 of the stop plates. The ends of the fingers 31 may be tapered as shown to the regions where they are connected to the webs.

In the valve described with reference to Figs. 1 to 4 the inlet face is substantially in the plane of the upstream ends of the stop plates. If desired, the inlet losses may be reduced by extending the valve body upstream as shown in Figs. 8 and 9, for example by about ⅜ in. and suitably flaring the inlet as shown. The upstream flat surface 50 of the flange must be made of adequate size, if necessary by increasing the breadth of the flange.

Referring now to Figs. 10 to 12 which show a valve according to the invention suitable for use as a delivery valve, like parts are given the same reference as in the earlier figures but with a prime.

The side valve seat members 21' are made thicker than in the valve previously described in order to withstand the higher bursting pressures which are developed and preferably the body is of steel. In this valve end plates 51 are provided and are clamped to the rest of the assembly by eight screws through apertures 52.

In this valve the corrugations 33 in the laminae are not provided but instead, as seen in Fig. 13, the laminae are given a slight curvature (much exaggerated in Fig. 13 for clearness). When the clamping surfaces on the end plate 21' and stop plate 31' are forced together by the bolt 28' the part of the lamina between these surfaces is flattened and in this way a good seal is obtained.

It may be found desirable to provide a groove 53 in each clamping surface of each of the stop plates, the groove extending between the holes for the tie bolts 28' and being of width slightly less than the diameter of these holes. The grooves have sharp edges and when a slightly curved lamina which presents a convex surface to the groove is pressed against these edges during clamping, there is approximately line contact between the lamina and the edges of the groove, thus providing a more effective seal than would be possible without the groove.

The laminae may be uniformly curved throughout their length, the curvature being for example such that there is a preload of 4 mm. at the free edge of the laminae 1¼₆ in. from its bend line 35' when bearing upon the supporting fingers.

The profile of the stop plates 27' is more complex than that of the stop plates 27 in Figs. 1 to 4 and provides a further shoulder 54 to engage the blade when moving into its open position, and still further reduce its effective free length. Two dirt grooves are thus provided, one between the clamping surface and the shoulder 36' and the other between 36' and 54.

I claim:

1. A non-return valve comprising a body, including a supporting member and a seating member, a plurality of spaced ribs upon said seating member, a clamping surface upon said supporting member and upon each of said ribs, said clamping surfaces being approximately parallel to the direction of fluid flow through the valve, clamping means exerting pressure in a direction approximately perpendicular to the first named direction, and a resilient lamina having a region thereof at its root end clamped by said clamping means between said clamping surfaces on said ribs and said supporting member, arranged to form a fluid-tight seal with said seating member when in its closed position, and to have its free end lifted off said seating member in response to fluid pressure in one direction through the valve, characterised in that said lamina is curved in the said region and in the face portion thereof between adjacent ribs about an axis substantially perpendicular to the longitudinal axes of said ribs.

2. A non-return valve according to claim 1, wherein said lamina is corrugated in a direction transverse of said lamina, and said clamping surface upon said supporting member is grooved to accommodate said corrugation.

3. A non-return valve according to claim 1, wherein said lamina is smoothly curved throughout its length, the said curvature being at least partially reduced in the areas engaged by the clamping surfaces on said ribs.

4. A non-return valve according to claim 1, wherein said supporting member comprises a stop plate positioned to support said lamina in the open position thereof and limit the movement of said lamina.

5. A non-return valve according to claim 1, wherein said body and said lamina are of materials of different coefficients of thermal expansion, said seating member has a seating engaged by the free end of said lamina in the closed position thereof, said seating has a cut away portion on the side thereof remote from said root end of the lamina, and the free end of said lamina projects over said cut-away portion and is spaced from such portion when the valve is cold.

6. A non-return valve according to claim 1 for attachment to a housing, wherein said lamina flexes about a bend line along the boundary of said clamping surfaces nearer the free end of said lamina, said body has an outwardly-projecting flange provided with a sealing surface, to engage a surface on the housing, and the plane of said sealing surface lies on the side of said bend line remote from the free end of said lamina.

7. A non-return valve according to claim 1, wherein said clamping surface of said supporting member is provided with a groove running in a direction transverse with respect to said lamina, and said lamina, at least before clamping thereof, presents a convex surface to said groove.

8. A non-return valve according to claim 1 wherein said supporting member has a plurality of shoulders positioned to be engaged successively by said lamina when moving into its open position.

9. A non-return valve according to claim 1, wherein the seating member has a seating portion, said seating portion being a flat plane surface adapted to be engaged by one side of said lamina adjacent the free end thereof in said closed position, said seating portion having a cut-away portion, said free end projecting over and being spaced from said cut-away portion when the valve is cold, said cut-away portion being adapted to receive carbon formed on said free end, thus permitting said free end to form a good seal with said flat plane surface, notwithstanding the deposit of carbon on said free end.

References Cited in the file of this patent

UNITED STATES PATENTS

| 943,996 | Reinecing | Dec. 21, 1909 |
| 1,276,478 | Bechtold | Aug. 20, 1918 |
| 2,199,307 | Eichelberg | Apr. 30, 1940 |
| 2,408,056 | Farmer | Sept. 24, 1946 |
| 2,434,734 | Buschmann | Jan. 20, 1948 |

FOREIGN PATENTS

| 496,795 | Great Britain | of 1938 |
| 583,847 | Great Britain | of 1947 |